C. GLAUS.
BUTTER CUTTING TOOL.
APPLICATION FILED JULY 2, 1910.
969,947.
Patented Sept. 13, 1910.
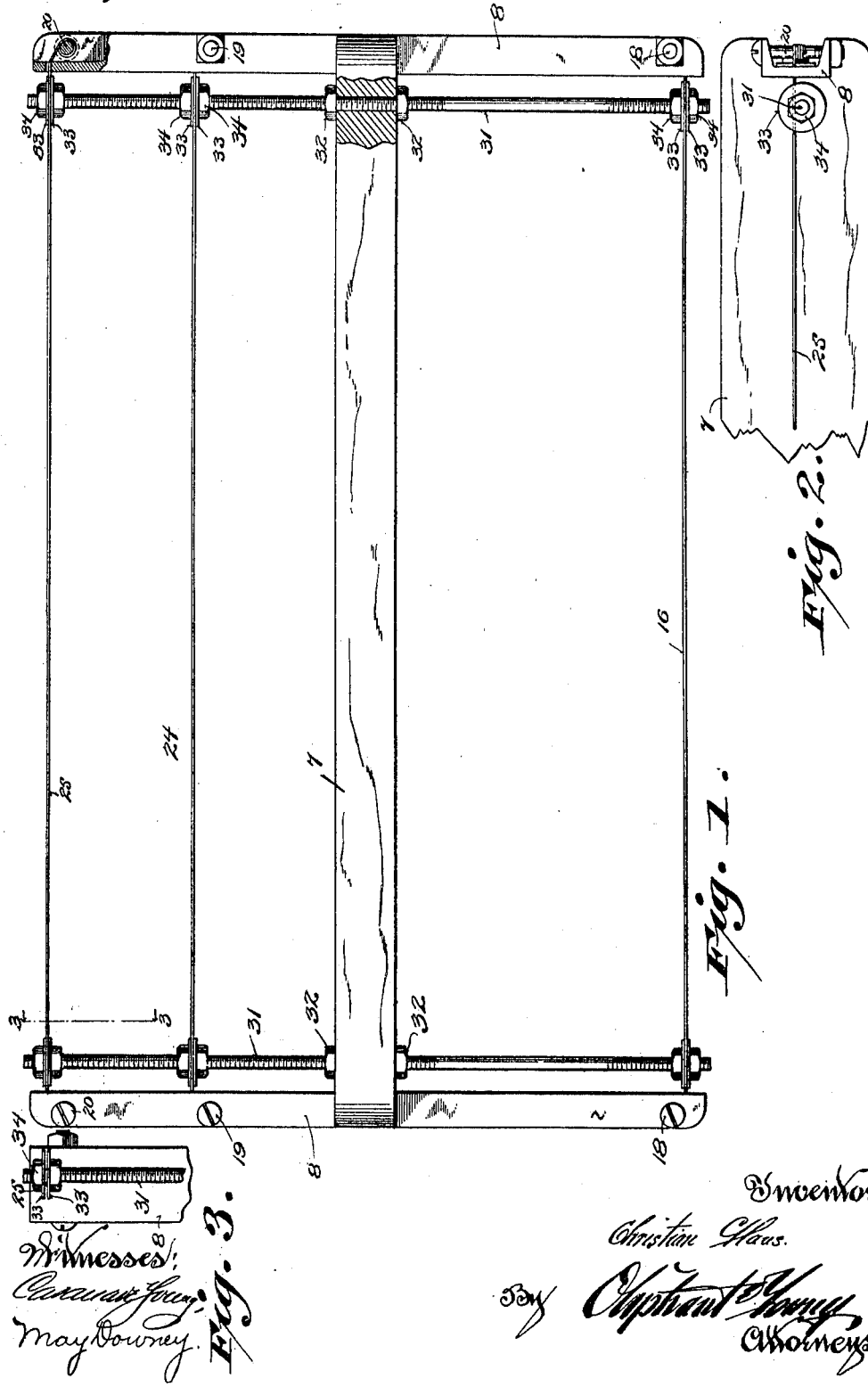

UNITED STATES PATENT OFFICE.

CHRISTIAN GLAUS, OF MILWAUKEE, WISCONSIN.

BUTTER-CUTTING TOOL.

969,947.

Specification of Letters Patent. Patented Sept. 13, 1910.

Application filed July 2, 1910. Serial No. 570,067.

*To all whom it may concern:*

Be it known that I, CHRISTIAN GLAUS, a citizen of the United States, and resident of Milwaukee, in the county of Milwaukee and State of Wisconsin, have invented certain new and useful Improvements in Butter-Cutting Tools; and I do hereby declare that the following is a full, clear, and exact description thereof.

My invention consists in what is herein particularly set forth with reference to the accompanying drawings and pointed out in the claims of this specification, its object being to improve the butter-cutting tool for which Letters-Patent No. 956,072 were granted to me April 26, 1910, by providing said tool with means for effecting ready minute variations of the adjustments of the wires thereof to compensate for shrinkage on the part of angular molds of butter from predetermined proportions, in order that all the "print" subdivisions of the molds may be of uniform dimensions, and the preferred means herein specified serve to stiffen the aforesaid tool.

Figure 1 of the drawings represents a side elevation of my improved butter-cutting tool partly broken away; Fig. 2, a plan view of a fragment of the tool, and Fig. 3, an elevation of a fragment of said tool partly in transverse section on the plane indicated by line 3—3 in Fig. 1.

Referring by numerals to the drawings, 7 indicates the bar, 8 each of the pair of channel-iron rails and 16, 24, 25, the wires of a butter-cutting tool similar to the one specified in the Letters-Patent aforesaid, said wires being respectively in connection with winding-bolts 18, 19, and 20, and stretched taut between said rails.

Extending through the bar 7, adjacent to the rails 8, are screw-threaded vertical rods 31 and these rods are held in adjusted position by means of clamp-nuts 32 thereon abutting opposite faces of said bar.

Each of the several wires 16, 24 and 25 extend between a pair of washers 33 on each of the rods 31, and each washer is opposed by a clamp-nut 34 run on the same rod.

Although taut between the rails 8, each of the wires 16, 24 and 25 can be sprung inward or outward, and by manipulation of the nuts 34, minute variations of adjustments of said wires to or from the bar may be readily effected by the operator of the tool. Such adjustments are desirable when butter molds to be cut into prints have shrunk from predetermined angular proportions, as thereby compensation for the shrinkage can be readily effected in order that all the prints cut from a mold of the butter may have uniform dimensions and be of equal weight.

It has been determined in practice that the rods 31 clamped in connection with the bar 8 and wires 16, 24 and 25 of the tool serve to stiffen said tool and thus prevent the same from twisting when employed to cut very dense butter.

I claim:

1. A butter-cutting tool comprising a pair of rails, a bar in connection at its ends with the rails approximately midway of their extremities, taut wires extending between said rails at normally predetermined distances from opposite sides of the bar, rods held in connection with said bar to extend in opposite directions from the same adjacent to the rails, and wire-clamping devices adjustable on the rods.

2. A butter-cutting tool comprising a pair of rails, a bar in connection at its ends with the rails approximately midway of their extremities, taut wires extending between said rails at normally predetermined distances from opposite sides of the bar, rods held in connection with said bar to extend in opposite directions from the same adjacent to the rails, washers paired on the rods to oppose the wires in opposite directions, and clamp-nuts in engagement with said rods against the washers.

3. A butter-cutting tool comprising a pair of rails, a bar in connection at its ends with the rails approximately midway of their extremities, taut wires extending between said rails at normally predetermined distances from opposite sides of the bar, screw-threaded rods extending through the bar adjacent to the aforesaid rails, clamp-nuts on the rods against opposite faces of said bar, and wire clamping devices adjustable on the rods.

4. A butter-cutting tool comprising a pair of rails, a bar in connection at its ends with the rails approximately midway of their extremities, taut wires extending between said rails at normally predetermined distances from opposite sides of the bar, screw-threaded rods extending through the bar adjacent to the aforesaid rails, clamp-nuts on the rods against opposite faces of said bar, washers paired on said rods to oppose the wires in opposite directions, and clamp-nuts in engagement with the aforesaid rods against the washers.

In testimony that I claim the foregoing I have hereunto set my hand at Milwaukee, in the county of Milwaukee and State of Wisconsin, in the presence of two witnesses.

CHRISTIAN GLAUS.

Witnesses:
ALMA MEHL,
OSCAR C. MEHL.